(12) United States Patent
Wuthnow et al.

(10) Patent No.: US 9,009,790 B2
(45) Date of Patent: Apr. 14, 2015

(54) ASSOCIATION OF MULTIPLE PUBLIC USER IDENTIFIERS TO DISPARATE APPLICATIONS IN AN END-USER'S DEVICE

(75) Inventors: Mark Steven Wuthnow, Austin, TX (US); Richard R. Erickson, Farmingdale, NJ (US); William Rosenberg, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 805 days.

(21) Appl. No.: 12/880,073

(22) Filed: Sep. 11, 2010

(65) Prior Publication Data

US 2012/0066745 A1   Mar. 15, 2012

(51) Int. Cl.
| | | |
|---|---|---|
| *G06F 7/04* | (2006.01) | |
| *G06F 21/62* | (2013.01) | |
| *H04W 4/00* | (2009.01) | |
| *H04W 4/20* | (2009.01) | |
| *H04W 12/08* | (2009.01) | |
| *H04L 29/08* | (2006.01) | |

(52) U.S. Cl.
CPC ........... *G06F 21/6245* (2013.01); *H04W 4/001* (2013.01); *H04W 4/206* (2013.01); *H04W 12/08* (2013.01); *H04L 67/306* (2013.01)

(58) Field of Classification Search
CPC ..... H04W 4/001; H04W 4/206; H04W 12/08; H04L 67/306
USPC .................. 726/1, 2, 4; 713/168, 170
See application file for complete search history.

(56) References Cited

U.S. PATENT DOCUMENTS

| | | | |
|---|---|---|---|
| 7,231,640 B2 | 6/2007 | Evans | |
| 7,274,286 B2 | 9/2007 | Tagato | |
| 7,313,702 B2 | 12/2007 | Shimada | |
| 7,343,550 B2* | 3/2008 | Saidenberg et al. | 715/736 |
| 7,346,923 B2 | 3/2008 | Atkins | |
| 7,428,750 B1* | 9/2008 | Dunn et al. | 726/8 |
| 7,539,732 B2* | 5/2009 | Kelso et al. | 709/206 |
| 7,787,879 B1* | 8/2010 | Philips et al. | 455/435.1 |
| 2006/0031683 A1* | 2/2006 | Marion et al. | 713/185 |
| 2006/0218396 A1* | 9/2006 | Laitinen et al. | 713/167 |
| 2008/0243853 A1* | 10/2008 | Reding et al. | 707/9 |
| 2009/0043657 A1* | 2/2009 | Swift et al. | 705/14 |
| 2010/0043064 A1 | 2/2010 | Shu | |
| 2010/0057743 A1* | 3/2010 | Pierce | 707/10 |
| 2010/0063976 A1* | 3/2010 | Bertin et al. | 707/769 |
| 2010/0177769 A1 | 7/2010 | Barriga | |

* cited by examiner

*Primary Examiner* — Saleh Najjar
*Assistant Examiner* — Peiliang Pan
(74) *Attorney, Agent, or Firm* — Hartman & Citrin LLC

(57) ABSTRACT

Devices and methods are disclosed which relate to managing multiple public user identifiers (PUIDs) in a database by setting customizable access rules and requiring authorization from applications for access. These PUIDs can be virtually any electronic identifier such as a telephone number, email address, FACEBOOK name, etc. The PUID database is on the memory of a mobile communication device. Applications on the mobile communication device or on the network request access to the PUID database. Access logic on the mobile communication device checks another database of PUID Access Policies and Preferences (PAPP) for authorization. The PAPP database may allow the application immediate access, deny access, or query the user for allowance. The PUID database and PAPP database are on a server on a network.

18 Claims, 6 Drawing Sheets

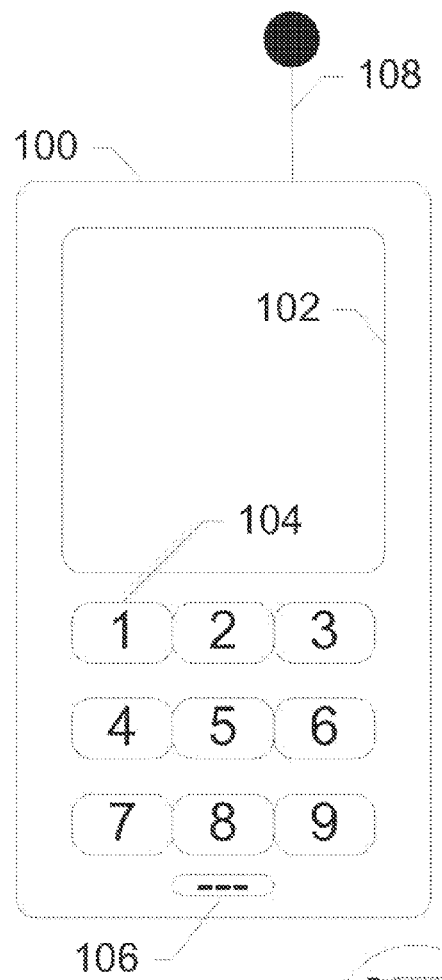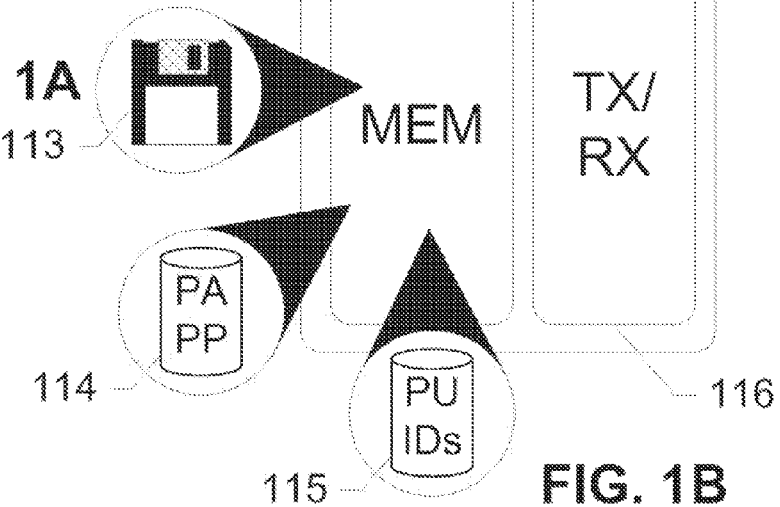
FIG. 1A
FIG. 1B

US 9,009,790 B2

ASSOCIATION OF MULTIPLE PUBLIC USER IDENTIFIERS TO DISPARATE APPLICATIONS IN AN END-USER'S DEVICE

BACKGROUND OF THE INVENTION

1. Field of the Invention

The present invention relates to electronic identifiers. More specifically, the present invention relates to storing and controlling access to public identifiers on a network.

2. Background of the Invention

A user today has many forms of identifiers that are made public in order for them to communicate with other users over a public network. These identifiers can be in many forms such as a telephone number (E.164 format), an email address (username@domain), application specific identifier (e.g., Skype address) or a social website address (e.g., URI).

With the introduction of IMS (IP Multimedia Subsystem), a user can now have multiple public identifiers in their device. Each of these different public identifiers (PUIDs) may be registered with the public network depending on the specific identity that the user wishes to display or use. Independent of this, an application may wish to know the different identifiers of the user in order to blend these identities into a new service.

Today, IMS devices only register a single public user identifier, referred to in the 3GPP standards as the IMPU (IP Multimedia Public Identity). This identifier takes the form of "E.164 format number"@domain. The E.164 format number is the telephone number of the subscriber that other users use to communicate with the subscriber. This subscriber may also have other identifiers he uses to communicate with other persons (or objects) based on different communities in which he participates.

According to the latest standards, an IMS device will be able to support multiple identifiers for the subscriber (i.e., multiple IMPUs). However these standards are silent on how multiple IMPUs are to be used in a device. Separately, today's devices (and expected future devices) can support multiple applications which include downloaded third party applications. Some of these applications or services aim to access the subscriber's different identifiers and combine them into a new service. Various forms of these services are available today. One example might be a notification service for a package delivery application that first tries to call a user's home telephone for delivery time, and if no answer occurs, then an email notification is sent. For services such as these, the user must enter their multiple identifiers (in this example—home phone and email address) for each application they are accessing. If a new notification service is subscribed to (e.g., flight update), then the subscriber must reenter this information. For example, iTunes alone makes thousands of applications available to subscribers for download to their devices. Many of these applications are related to services which give the user an identifier. With this amount of applications available, users can quickly amass many identifiers.

What is needed is for these different identifiers to be discoverable by the device's various applications automatically without the subscriber having to individually type in multiple identifiers for each new application they download. An individual's identifiers may not necessarily be associated with a network, but the identifier can still be registered with that network.

SUMMARY OF THE INVENTION

The present invention includes devices, systems, and methods for having multiple identities in a user's device. Exemplary embodiments of the present invention manage multiple public user identifiers in a PUID database by setting customizable access rules and requiring authorization from applications for access. In these exemplary embodiments, these PUIDs can be virtually any unique electronic identifier such as a telephone number, email address, FACEBOOK name, etc. In some exemplary embodiments, the PUID database is on the memory of a mobile communication device. Applications on the mobile communication device or on the network request access to the PUID database. Access logic on the mobile communication device checks another database of PUID Access Policies and Preferences (PAPP) for authorization. The PAPP database may allow the application immediate access, deny access, or query the user for allowance. In other exemplary embodiments, the PUID database and PAPP database are on a server on a network.

Furthermore, the elements of the present invention fit seamlessly into the IMS standard. In exemplary embodiments, a Home Subscriber Server (HSS) registers and stores the PUIDs. The HSS not only registers PUIDs created by the network, but others as well. In these embodiments, the network need not contact the mobile communication device to gain access to a PUID, although user input may still be required.

In one exemplary embodiment, the present invention is a mobile communication device. The mobile communication device includes a processor, a memory in communication with the processor, a transceiver in communication with the processor, a PUID database on the memory including a plurality of PUIDs, a PAPP database on the memory, and an access logic on the memory. The access logic is for receiving a request for access to a PUID from an application, referencing the PAPP database for permission, and granting the application access to the PUID.

In another exemplary embodiment, the present invention is a system for association of multiple public user identifiers to disparate applications. The system includes a network, a mobile communication device in communication with the network, a PUID server in communication with the network, a PUID database on the PUID server including a plurality of PUIDs, a PUID Management Cloud Service (PMCS) database on the PUID server, and an access logic on the PUID server. The access logic is for receiving a request for access to a PUID from an application, referencing the PMCS database for permission, and granting the application access to the PUID.

In yet another exemplary embodiment, the present invention is a method for managing disclosure of multiple public user identifiers to disparate applications. The method includes receiving a request for access to a PUID from an application, referencing a rules database for permission, and granting the application access to the PUID. A plurality of PUIDs is stored in a PUID database.

BRIEF DESCRIPTION OF THE DRAWINGS

FIGS. 1A-B show a mobile communication device for association of multiple public user identifiers, according to an exemplary embodiment of the present invention.

DETAILED DESCRIPTION OF THE INVENTION

Figure 2:
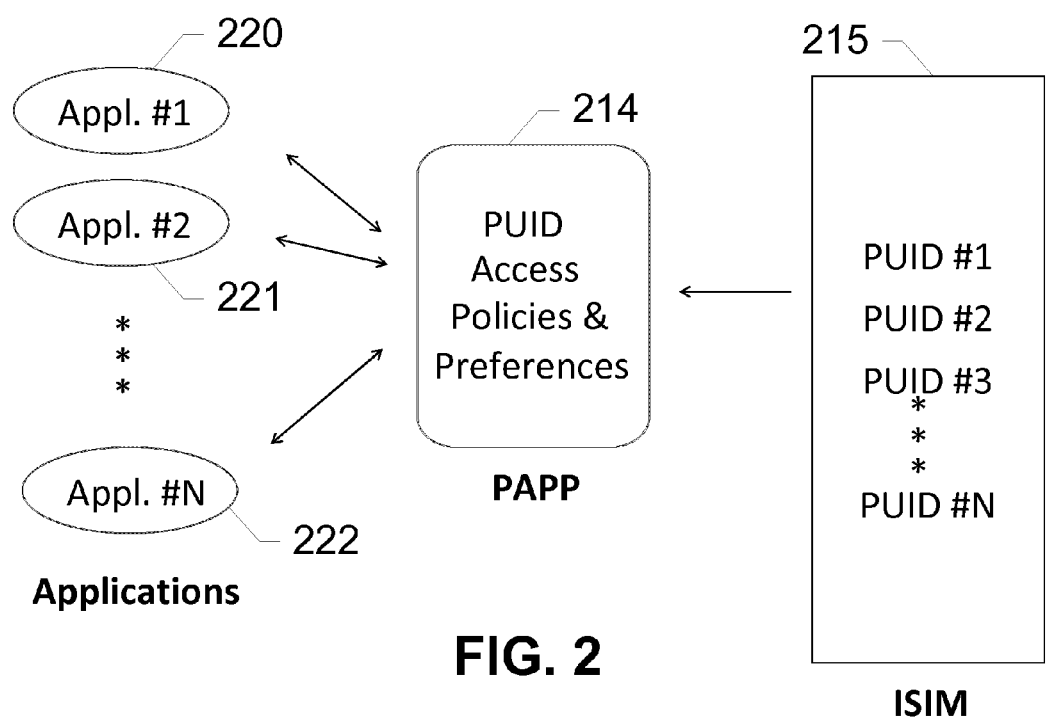
FIG. 2 shows a logical architectural model for a mobile communication device, according to an exemplary embodiment of the present invention.

The present invention manages multiple public user identifiers in a PUID database by setting customizable access rules requiring authorization from applications for access. In exemplary embodiments, these PUIDs can be virtually any unique electronic identifier such as a telephone number, email address, FACEBOOK name, etc. In some exemplary embodiments, the PUID database is on the memory of a mobile communication device. Applications on the mobile communication device or on the network request access to the PUID database. Access logic on the mobile communication device checks another database of PUID Access Policies and Preferences (PAPP) for authorization. The PAPP database may allow the application immediate access, deny access, or query the user for allowance. In other exemplary embodiments, the PUID database and PAPP database are on a server on a network.

Furthermore, the elements of the present invention fit seamlessly into the IMS standard. In exemplary embodiments, a Home Subscriber Server (HSS) registers and stores the PUIDs under IMS. The HSS not only registers PUIDs created by the network, but others as well. In these embodiments, the network need not contact the mobile communication device to gain access to a PUID, although user input may still be required.

"Mobile communication device", as used herein and throughout this disclosure, refers to any electronic device capable of wirelessly sending and receiving data. A mobile communication device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories). Many mobile communication devices use Subscriber Identity Module (SIM) cards or Intelligent SIM (ISIM) cards, which are removable, read/write memory cards.

"Logic", as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a telecommunication network, logic may be programmed on a server, or a complex of servers. A particular logic unit is not limited to a single logical location on the telecommunication network.

Mobile communication devices communicate with each other and with other elements via a network, for instance, a wireless network, or a wireline network. A "network" can include broadband wide-area networks such as cellular networks, local-area networks (LAN), and personal area networks, such as near-field communication (NFC) networks including BLUETOOTH®. Communication across a network is preferably packet-based; however, radio and frequency/amplitude modulations networks can enable communication between mobile communication devices using appropriate analog-digital-analog converters and other elements. Communication is enabled by hardware elements called "transceivers." Mobile communication devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A network typically includes a plurality of elements that host logic for performing tasks on the network.

For the following description, it can be assumed that most correspondingly labeled structures across the figures (e.g., 114 and 214, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIGS. 1A-B show a mobile communication device 100 for association of multiple public user identifiers, according to an exemplary embodiment of the present invention. The external components of mobile communication device 100 include a display 102, an input 104, a microphone 106, and an antenna 108. Display 102 is a liquid crystal display (LCD) which serves as a visual output for the user. Input 104 is a keypad for entering information and commands to mobile communication device 100. Microphone 106 accepts aural input and allows mobile communication device 100 to deliver voice communication to the network and other mobile communication devices. The antenna 108 sends and receives wireless signals to and from the network. Mobile communication device 100 can further include audio output in the form of a speaker or a headphone jack (not shown).

The inner components of mobile communication device 100 include a processor 110, a memory 112, an access logic 113 on the memory, a PAPP database 114 on the memory, and a PUID database 115 on the memory, and a transceiver 116. Processor 110 receives input and issues commands to deliver output through the other components. Memory 112 holds information for enabling processor 110 to operate the other components of mobile device 100, and contains access logic 113, PAPP database 114, and PUID database 115. Access logic 113 receives requests for PUIDs in PUID database 115, and references PAPP database 114 to determine whether or not to grant access. PAPP database 114 includes rules for access to PUIDs in PUID database 115. PUID database includes a plurality of PUIDs for the user. Each PUID has an associated array of data. A sample of the associated data is in Table 1:

TABLE 1

| Information | Notes |
| --- | --- |
| Identifier | URI form (username@domain) |
| Application Array { | Applications associated with this PUID |
|   Application Type | Application Type (e.g., IM, email, social network, cellular, etc.) |
|   Application Name } | Application Name (e.g. AT&T Mobility, Facebook, |

TABLE 1-continued

| Information | Notes |
|---|---|
| | Gmail, etc.) |
| Network Applicability | Apply only to certain networks (e.g., cellular, WiFi, private, etc.) |
| Register with Network | When/should this identifier be sent to the serving network |
| Access Control Array { | Indicates which device apps may access this identifier |
| Application Name } | Identification of application (e.g., certificate or other ID) |
| Other | Other fields (such as location information) as required |
| Future Expansion | Design to add new attribute fields to Registry |

The associated array of data for each PUID varies from embodiment to embodiment. Some embodiments have little information while other embodiments have more information for each PUID.

Transceiver 116 converts wireless signals received by antenna 108 to information capable of processing by processor 110, and vice-versa. Transceiver 116 can use one or more wireless protocols, including cellular RF, WiFi, BLUETOOTH, etc., to communicate with the network and other mobile communication devices. Camera 118 allows for video input for mobile communication device 100, for use in taking pictures, sharing video, etc.

In other embodiments of the mobile communication device, other displays are used, such as an LED display, OLED display, etc. In some embodiments, the display is used as a touch-sensitive input device, i.e. a touch screen. A touch screen allows the user to view output on the display as well as use the display to give input. In some touch screen embodiments, the mobile communication device does not have a physical keypad for input. Instead, a virtual keypad is displayed on the touch screen and the user inputs by touching the virtual keys. Other forms of input such as full keyboards, accelerometers, motion sensors, etc., can be utilized in the mobile communication device. The memory can be a non-removable internal memory, or a removable memory such as in a subscriber identity module (SIM) card. Many mobile communication devices have more than one transceiver or a transceiver that supports more than one protocol. For instance, it is not uncommon for a mobile communication device to support cellular radio frequency (RF), WiFi, and BLUETOOTH® protocols. Embodiments of mobile communication device 100 include RFID or smartcard readers as well.

FIG. 2 shows a logical architectural model for a mobile communication device, according to an exemplary embodiment of the present invention. The architectural model includes applications 220-222, PAPP database 214, and PUID database 215. Applications 220-222 wish to access one or more PUIDs from PUID database 215. PAPP database 214 is referenced for access rules for specific PUIDs. If access is allowed according to the rules in PAPP database 214, then the requesting application is allowed access to the specific PUID within PUID database 215. More on the process of access is outlined below with respect to FIG. 6.

Virtually any application may request access to any one or more of the user's PUIDs in the PUID database. These applications may reside on the memory of the mobile communication device or on an application server in communication with the mobile communication device. The access rules in the PAPP database range from global rules to PUID specific rules. Each rule can be simple, such as allowing unregulated access to a specific PUID, or complex, such as allowing access to a specific PUID within certain user-defined times and locations. Each PUID may be associated with several rules.

Figure 3:
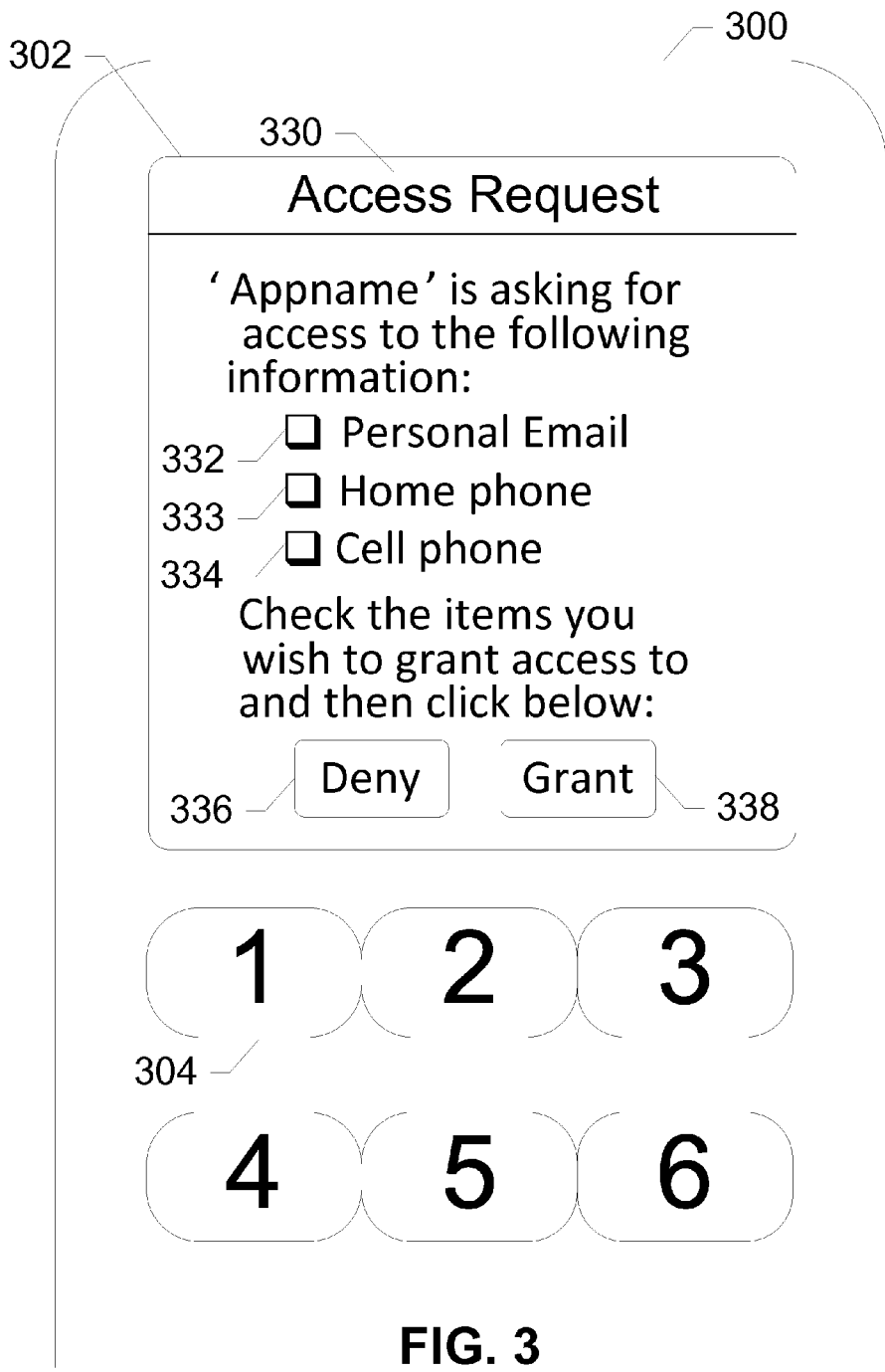
FIG. 3 shows a screen shot of an access request, according to an exemplary embodiment of the present invention.

FIG. 3 shows a screen shot of an access request 330, according to an exemplary embodiment of the present invention. Access request 330 uses a GUI displayed on a display 302 of mobile communication device 300, including requested PUIDs 332, 333, and 334, a Deny option 336, and a Grant option 338. In this embodiment, the requested PUIDs are personal email 332, home phone 333, and cell phone 334. Logic on mobile device 300 triggers access request 330 when a user input is required before allowing access. This is usually the case for new PUIDs, and when the PAPP policies require user input specifically. The user checks each check box next to the requested PUIDs to which he wants to allow access. The user then selects Grant option 338 to allow access to the application. If the user does not want to allow access to any of the PUIDs, then the user can select the Deny option 336.

There are many other forms of access requests across different embodiments of the present invention. Some have an option to remember the decision for that program so that the program will no longer need to query the user for permission. Conversely, an option to allow only once appears on some embodiments. The selections are made from the keypad serving as input on the mobile communications device in this embodiment, but other embodiments use touch screens for input. While this embodiment features a visual request, in other embodiments the request can be aural. Many ways of querying the user for access will be readily apparent to those having skill in the art upon reading this disclosure. Mere access is just one type of request an application may present. Requests to change a PUID are also made by applications, and such requests also require the user's input.

Figure 4:
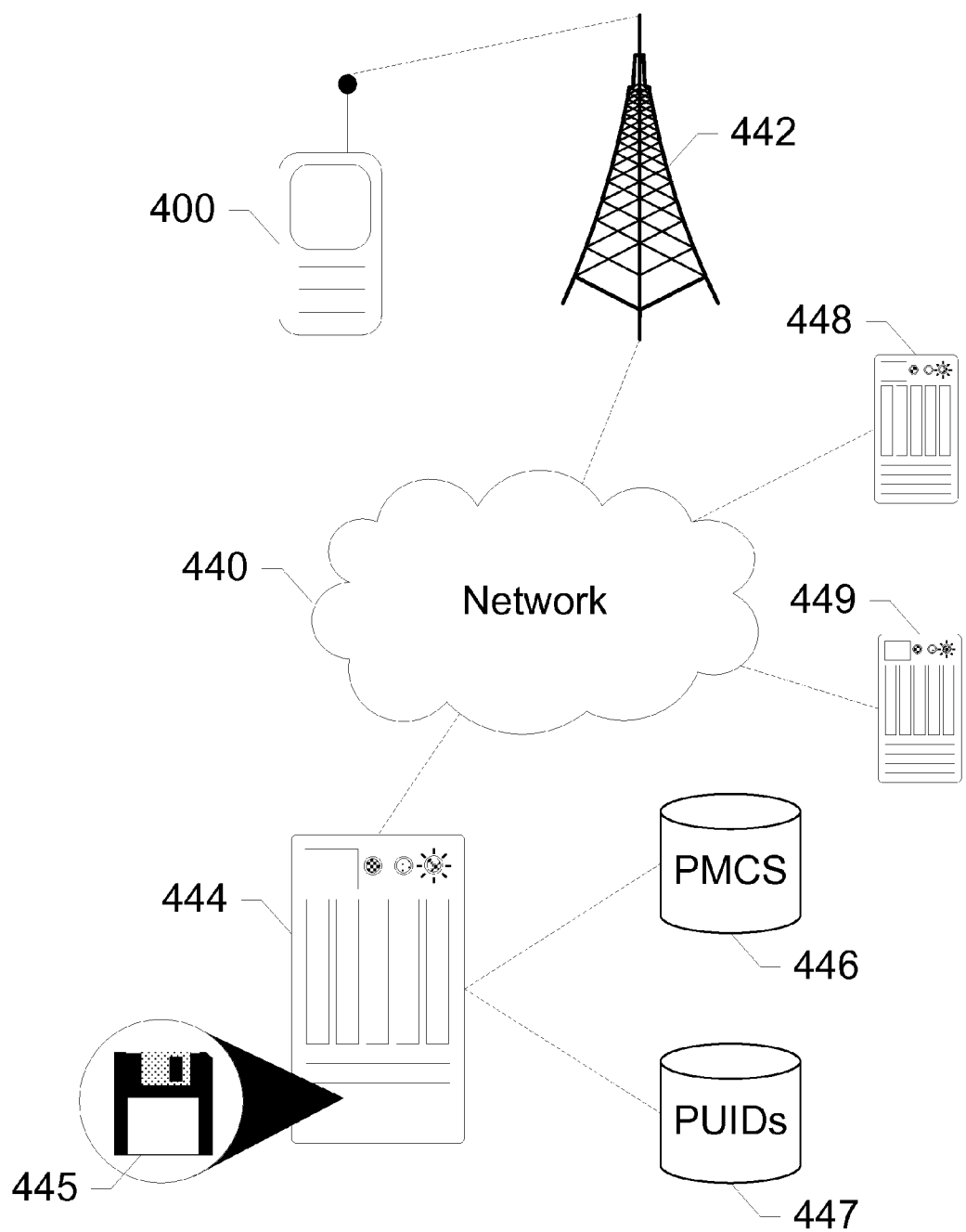
FIG. 4 shows a network for association of multiple public user identifiers, according to an exemplary embodiment of the present invention.

FIG. 4 shows a system for association of multiple public use identifiers, according to an exemplary embodiment of the present invention. A mobile communication device 400, a radio network 442, a PUID server 444, an originating application server 448, and a non-originating application server 449 all communicate with each other and other network elements via network 440. PUID server 444 also includes an access logic 445, a PMCS database 446, and a PUID database 447. A user having mobile communication device 400 communicates with network 440 through radio network 442. Radio network 442 includes elements such as cell towers, base stations, node Bs, radio network controllers, gateways, etc. When the user having mobile communication device 400 signs onto the network, the user having mobile communication device 400 identifies by sending its PUIDs to PUID server 444 across network 440. These PUIDs are stored in PUID database 447. The user having mobile communication device 400 communicates with an application on originating application server 448 to create a new PUID. The new PUID is sent to PUID database 447 where PUID server 444 includes attributes as follows in Table 2:

TABLE 2

| Information | Notes |
|---|---|
| Identifier | URI form (username@domain) |
| End User Id | The operator's identification for the end user |
| Originating App Name | Name of the app that created the PUID identifier |
| Originating App Type | Type of app that created the PUID identifier |
| Originating App Credentials | Credentials that identify the originating app |
| Application Array { | Applications associated with this PUID |
| Application Type | Application Type (e.g., IM, email, social network, cellular, etc.) |

TABLE 2-continued

| Information | Notes |
|---|---|
| Application Name } | Application Name (e.g. AT&T Mobility, Facebook, Gmail, etc.) |
| Access Control Array { | Indicates which device apps may access this identifier |
| Device Id | Indicates the device |
| Application Name } | Indicates the application on the device that may access the identifier |
| Network Applicability | Apply only to certain networks (e.g., cellular, WiFi, private, etc.) |
| Register with Network | When/should this identifier be sent to the serving network |
| Other | Other fields (such as location information) as required |
| Future Expansion | Design to add new attribute fields to Registry |

Since the application on originating application server 448 created the new PUID, PUID server 444 lists the application on originating application server 448 as the "Originating App". When mobile communication device 400 is in communication with the application on originating application server 448, requests to change the new PUID are accepted. However, when the user having mobile communication device 400 is in communication with an application on non-originating application server 449, requests to change the new PUID are denied. In other words, the application which originated the PUID can update the PUID, presumably because the user of mobile communication device 400 requested the change. An application which did not originate the PUID cannot update the PUID.

The mobile communication device takes many different forms in different embodiments, such as the examples given above. In a cellular network environment, the mobile communication device can be a cellular telephone, smartphone, netbook, etc., while the radio network can be a UMTS, CDMA, or other cellular network. In these embodiments, the network may take the form of an IMS network, or a network including IMS. The PUID server can be an HSS in these embodiments. The HSS, which normally stores a single identifier, stores all of the PUIDs, in addition to attributes for each PUID. Application servers can exist anywhere on the network, or on networks connected to the network. For example, application servers on the internet have access to the PUID server and may request access to one or more PUIDs.

Figure 5:
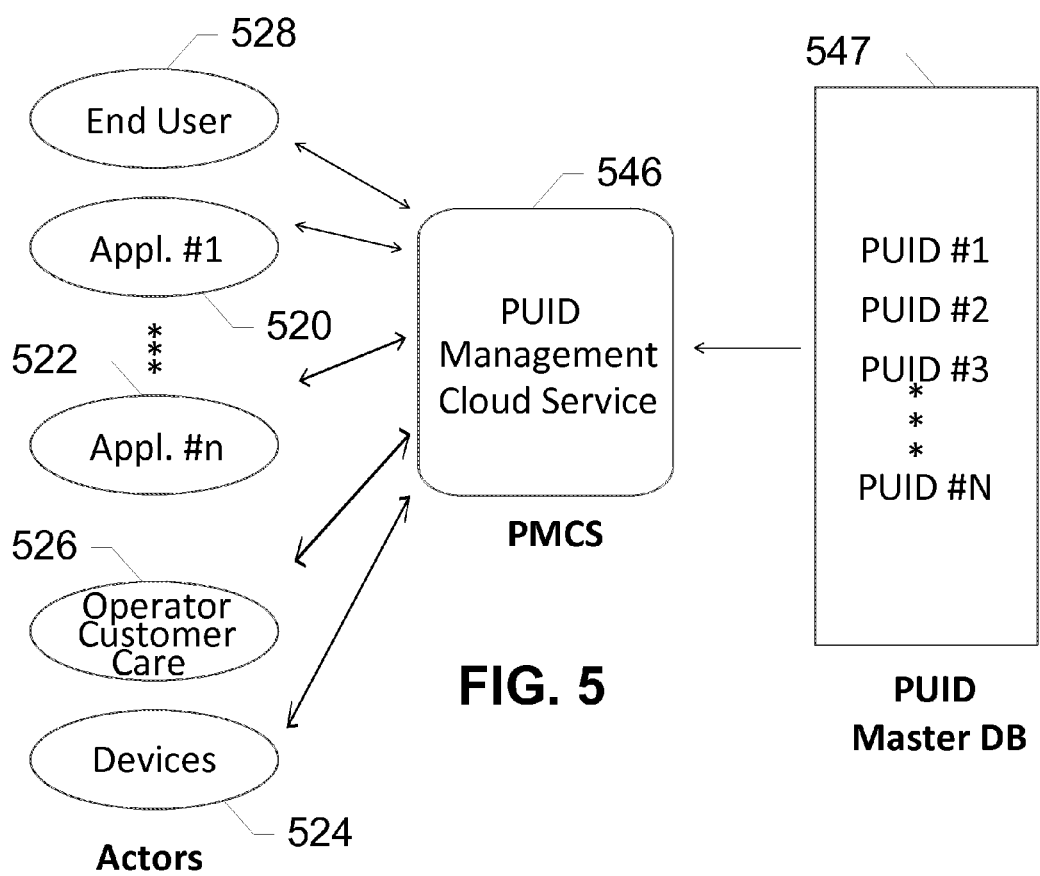
FIG. 5 shows a logical architectural model for a network, according to an exemplary embodiment of the present invention.

FIG. 5 shows a logical architectural model for a network, according to an exemplary embodiment of the present invention. The architectural model includes applications 520 and 522 (including other applications between 1 and n), devices 524, an operator of customer care 526, an end user 528, a PMCS database 546, and a PUID database 547. Since this embodiment is on a network, there are many more elements than simply applications that require access to PUIDs for various purposes. Devices 524, such as other devices of the same user, also request access to PUIDs to provide uniformity for said same user. In large commercial networks, an operator of customer care may need access to PUID database 547 to provide a better user experience. Finally, end user 528 may contact directly to view or modify PUID database 547, such as from a web portal on a terminal or computer. PMCS database 546 includes rules and functions like the PAPP database of the device embodiments, but includes rules for devices 524, operator of customer care 526, and end user 528. When access is requested, the PMCS database is referenced. If access is granted, then the requesting element receives the requested PUID. Otherwise, access is denied.

Virtually any application may request access to any one or more of the user's PUIDs in the PUID database. These applications may reside on the memory of the mobile communication device or on an application server in communication with the mobile communication device. The PMCS (cloud service) database is substantially the equivalent of the PAPP database, but for network use. The access rules in the PMCS database range from global rules to PUID specific rules. Each rule can be simple, such as allowing unregulated access to a specific PUID, or complex, such as allowing access to a specific PUID within certain times and locations. Each PUID may be associated with several rules. The end user may access the PUID server for access from virtually any device and or location on the network. If the user accesses the PUID server from a device other than his own, then authentication is required, such as a user name and password, or a biometric check for more advanced embodiments. However, the user may be associated with more than one device, and can use any of them without authentication in some embodiments. The operator of customer care is anyone or any entity that is entrusted by the network. This can include customer service representatives, IT specialists, etc. These entities can be selected by the network or by the user, depending on the embodiment.

Figure 6:
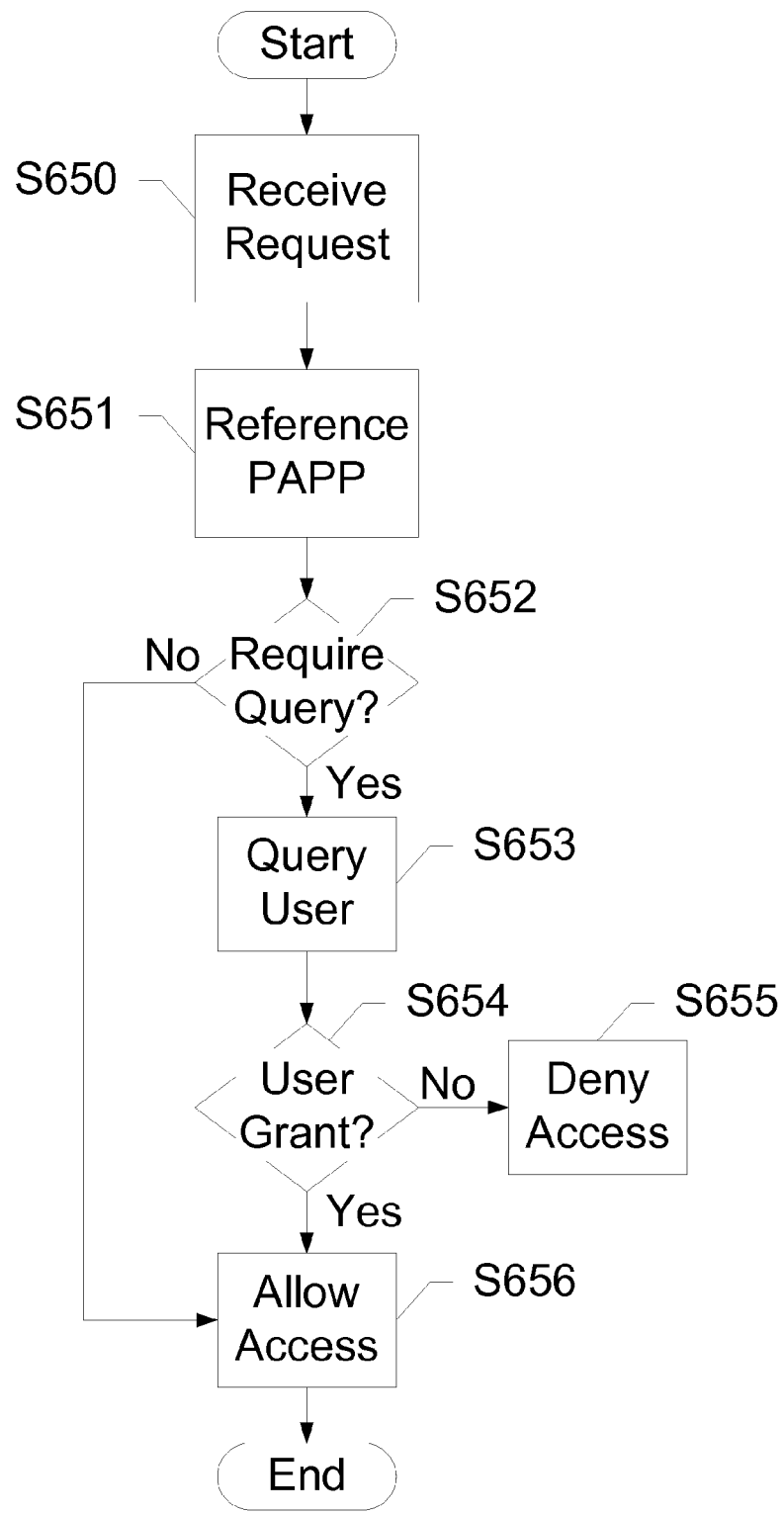
FIG. 6 shows a flow diagram of an access request, according to an exemplary embodiment of the present invention.

FIG. 6 shows a flow diagram of an access request, according to an exemplary embodiment of the present invention. In this embodiment, the PUID database is on the memory of the mobile communication device. First, the mobile communication device receives the request S650. The access logic of the mobile communication device references S651 the PAPP database to determine whether access is allowed S652. If the PAPP database shows that access is allowed, then the PUID is sent to the requesting element S656 and the method ends. However, the PAPP database may not allow access, or specifically require user input before allowing access. In either case, a user query S653 is made by displaying an access request on the display of the mobile communication device, such as in FIG. 3. If it is determined S654 that the access is granted, then the PUID is sent S656 to the requesting element and the method ends. If the user denies access, then access to the PUID is denied S655 to the requesting element.

For network embodiments, the PMCS database is referenced instead of the PAPP database. In some embodiments, the PAPP or PMCS database contains an automatic denial for certain PUIDs. However, by default, if no other rule exists, then the user is queried for access in most embodiments. In some embodiments, the requesting application is allowed to enter some text to be displayed for the user concerning the reasons for desiring access. For instance, the user may not immediately recognize the name of a delivery company, but upon seeing that the delivery company wants to know the home address so that a delivery can be made of the product the user recently ordered, the user will gladly accept and grant access. When granting access, the user can place stipulations or conditions on the grant, such as one-time-only, or for the next hour. Conversely, the user can select an option not to be asked again for that PUID by that program. Many other options and variations will be readily apparent to those having skill in the art upon reading this disclosure.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A mobile communication device comprising:
a display;
a processor; and
a memory that stores
a user identifier database that stores a plurality of user identifiers associated with a user of the mobile communication device,
an access database that stores rules for determining whether to allow access to each user identifier of the plurality of user identifiers included in the user identifier database, and
instructions which, when executed by the processor, cause the processor to perform operations comprising
receiving, from an application, a request for access to a user identifier of the plurality of user identifiers,
in response to receiving the request, referencing the access database for a permission regarding whether the application is allowed to access the user identifier based upon at least a portion of the rules,
in response to receiving the permission from the access database, granting the application access to the user identifier from the user identifier database, and
otherwise,
causing a query to be presented on the display, the query comprising an access request by which the user can grant or deny the application access to the user identifier,
in response to the query, receiving an input from the user, the input identifying whether the user grants or denies the application access to the user identifier,
in response to the input identifying that the user grants the application access to the user identifier, granting the application access to the user identifier from the user identifier database, and
in response to the input identifying that the user denies the application access to the user identifier, denying the application access to the user identifier from the user identifier database.

2. The mobile communication device in claim 1, wherein the operations further comprise:
determining that the application created the user identifier, and further in response to receiving the permission from the access database, granting the application the ability to edit the user identifier.

3. The mobile communication device in claim 1, wherein the access database further stores a preference to always grant the permission.

4. The mobile communication device in claim 1, wherein the memory is removable from the mobile communication device.

5. The mobile communication device in claim 1, wherein the application is hosted on an application server on a network.

6. The mobile communication device in claim 1, wherein the operations further comprise receiving an instruction to always allow access to the user identifier from the application.

7. A server comprising:
a processor; and
a memory that stores
a user identifier database that stores a plurality of user identifiers associated with a user,
an access database that stores rules for determining whether to allow access to each user identifier of the plurality of user identifiers included in the user identifier database, and
instructions which, when executed by the processor, cause the processor to perform operations comprising
receiving, from an application, a request for access to a user identifier of the plurality of user identifiers,
in response to receiving the request, referencing the access database for a permission regarding whether the application is allowed to access the user identifier based upon at least a portion of the rules,
in response to receiving the permission from the access database, granting the application access to the user identifier from the user identifier database, and
otherwise,
causing a query to be sent to a mobile communication device associated with the user so that the query can be presented on a display of the mobile communication device, the query comprising an access request by which the user can grant or deny the application access to the user identifier,
in response to the query, receiving an input from the user, the input identifying whether the user grants or denies the application access to the user identifier,
in response to the input identifying that the user grants the application access to the user identifier, granting the application access to the user identifier from the user identifier database, and
in response to the input identifying that the user denies the application access to the user identifier, denying the application access to the user identifier from the user identifier database.

8. The server in claim 7, wherein the operations further comprise:
determining that the application created the user identifier, and further in response to receiving the permission, granting the application the ability to edit the user identifier.

9. The server in claim 7, wherein the access database further stores a preference to always grant permission.

10. The server in claim 7, further comprising an application server hosting the application.

11. The server in claim 7, wherein the network is an IP multimedia system subsystem network.

12. The server in claim 11, wherein the server is a home subscriber server.

13. The server in claim 7, wherein the operations further comprise querying the user for access.

14. The server in claim 7, wherein the operations further comprise receiving an instruction to always allow access to the user identifier from the application.

15. A method comprising:
receiving, by a device comprising a processor and a memory, a request from an application, wherein the request is for access to a user identifier associated with a user of the device, the user identifier is one of a plurality of user identifiers associated with the user, and the plurality of user identifiers is stored in a user identifier database that is stored on the memory;
in response to receiving the request, referencing, by the processor, an access database for a permission regarding whether the application is allowed to access the user identifier based upon at least a portion of the rules, wherein the access database is stored on the memory;
in response to receiving the permission from the access database, granting the application access to the user identifier from the user identifier database; and
otherwise,
causing a query to be presented on a display of the device, the query comprising an access request by which the user can grant or deny the application access to the user identifier,
in response to the query, receiving an input from the user, the input identifying whether the user grants or denies the application access to the user identifier,
in response to the input identifying that the user grants the application access to the user identifier, granting the application access to the user identifier from the user identifier database, and
in response to the input identifying that the user denies the application access to the user identifier, denying the application access to the user identifier from the user identifier database.

16. The method in claim 15, further comprising:
determining that the application created the user identifier, and further in response to receiving the permission, granting the application the ability to edit the user identifier.

17. The method in claim 15, further comprising receiving an instruction to always allow access to the user identifier from the application.

18. The method in claim 15, further comprising sending the user identifier to a requesting application.

* * * * *